(12) United States Patent
Mishra

(10) Patent No.: US 7,853,109 B2
(45) Date of Patent: Dec. 14, 2010

(54) SINGLE MODE OPTICAL FIBER

(75) Inventor: Snigdharaj Kumar Mishra, Wilmington, NC (US)

(73) Assignee: Corning Incorporated, Corning, NY (US)

( * ) Notice: Subject to any disclaimer, the term of this patent is extended or adjusted under 35 U.S.C. 154(b) by 98 days.

(21) Appl. No.: 12/244,166

(22) Filed: Oct. 2, 2008

(65) Prior Publication Data

US 2010/0021116 A1   Jan. 28, 2010

Related U.S. Application Data

(60) Provisional application No. 61/135,698, filed on Jul. 23, 2008.

(51) Int. Cl.
*G02B 6/02* (2006.01)
*G02B 6/36* (2006.01)
*G02B 6/28* (2006.01)

(52) U.S. Cl. ..................... 385/127; 385/124
(58) Field of Classification Search .......... 385/123–128
See application file for complete search history.

(56) References Cited

U.S. PATENT DOCUMENTS

| | | | |
|---|---|---|---|
| 6,343,176 B1 | 1/2002 | Li et al. | 385/127 |
| 7,099,543 B2 * | 8/2006 | Bickham | 385/123 |
| 2004/0067034 A1 | 4/2004 | Rosenblum et al. | 385/127 |
| 2005/0135760 A1 | 6/2005 | Bickham | 385/124 |

* cited by examiner

*Primary Examiner*—Mark A Robinson
*Assistant Examiner*—Michael P Mooney
(74) *Attorney, Agent, or Firm*—Svetlana Z. Short

(57) ABSTRACT

A single mode optical fiber comprises: (i) a segmented core having at least three segments and (ii) a silica based clad layer surrounding and in contact with the core, the clad layer having a refractive index $n_c$. The first segment has a $\Delta_{max}$ % in the range of about 0.75 to 1.1, and $\Delta_0\% \geq 0.6\Delta max$ %, and an outer radius $r_1$ in the range of about 1.5 to 3.0 μm. The second segment has a $\Delta_2$% in the range of 0.00 to 0.15%. The third segment has a $\Delta_3$% in the range of less than 0.35%, an outer radius $r_3$ in the range of about 7 μm to 11 μm, a width $w_3$ in the range of about 1.5 to 3 μm, and volume $V_3 < 7\%$ μm². The refractive index profiles of the core segments are selected to provide: zero dispersion wavelength in the range of about 1565 nm to 1600 nm; total dispersion at 1550 nm in the range of about −6 to −0.5 ps/nm-km; and dispersion slope at 1550 nm is greater than 0.1.

18 Claims, 5 Drawing Sheets

SINGLE MODE OPTICAL FIBER

This application claims the benefit of U.S. Provisional Application Ser. No. 61/135,698, filed Jul. 23, 2008, entitled "Single Mode Optical Fiber."

FIELD OF INVENTION

The invention is directed to a single mode optical fiber designed for long repeater spacing, high data rate telecommunication systems. In particular, the single mode fiber combines excellent bend resistance, heat aging, low attenuation, and large effective area, $A_{\mathit{eff}}$, features that are desired for undersea applications.

TECHNICAL BACKGROUND

A fiber having large effective area reduces non-linear optical effects which can cause degradation of signals in high power systems. In general, a mathematical description of these non-linear effects includes the ratio, $P/A_{\mathit{eff}}$, where P is optical power. Thus, an increase in $A_{\mathit{eff}}$ produces a decrease in the non-linear contribution to the degradation of a light signal.

The requirement in the telecommunication industry for greater information capacity over long distances without electronic signal regeneration has led to a re-evaluation of single mode fiber index profile design.

The definition of high power and long distance is meaningful only in the context of a particular telecommunication system wherein a bit rate, a bit error rate, a multiplexing scheme, and perhaps optical amplifiers are specified. There are additional factors, known to those skilled in the art, which have an impact upon the meaning of high power and long distance. However, for most purposes, high power is an optical power greater than about 10 mW. In some applications, even signal power levels of 1 mW or less are sensitive to non-linear effects, so that $A_{\mathit{eff}}$ is still an important consideration in such lower power systems.

Therefore, it would be desirable to develop alternative single mode fibers that are suitable for use in undersea applications.

SUMMARY

According to one aspect of the present invention a single mode optical fiber comprises: (i) a segmented core having at least three segments, wherein the first segment has a $\Delta_{max}\%$ in the range of about 0.75 to 1.1, and $\Delta_0\% \geqq 0.6 \Delta max\%$, and an outer radius $r_1$ in the range of about 1.5 to 3.0 µm; the second segment has a $\Delta_2\%$ in the range of 0.00 to 0.15%; and the third segment has a $\Delta_3\%$ in the range of less than 0.35%, an outer radius $r_3$ in the range of about 7 µm to 11 µm, a width $w_3$ in the range of about 1.5 to 3 µm, and volume $V_3 < 7\% \mu m^2$; and (ii) a silica based clad layer surrounding and in contact with the core, the clad layer having a refractive index $n_c$; wherein the refractive index profiles of the core segments are selected to provide: zero dispersion wavelength in the range of about 1565 nm to 1600 nm; total dispersion at 1550 nm in the range of about −6 to −0.5 ps/nm-km; and dispersion slope at 1550 nm is greater than 0.1.

According to one embodiment of the present invention single mode optical fiber comprises: (i) a segmented core having at least three segments, wherein the first segment has a $\Delta_{max}\%$ in the range of about 0.75 to 1.1, an outer radius $r_1$ in the range of about 1.5 to 3.0 µm; the second segment has a $\Delta_2\%$ in the range of about 0.00 to 0.15%; and the third segment has a $\Delta_3\%$ in the range of less than 0.35%, an outer radius $r_3$ in the range of about 7 to 11 µm, a width $w_3$ in the range of about 1.5 to 3 µm, and volume $V_3 < 7\% \mu m^2$; and (ii) a silica based clad layer surrounding and in contact with the core, the clad layer having a refractive index $n_c$; wherein the refractive index profiles of the core segments are selected to provide: attenuation at 1550 nm of not greater than 0.25 dB/km; zero dispersion wavelength in the range of about 1565 nm to 1600 nm; total dispersion at 1550 nm in the range of about −6 to −0.5 ps/nm-km; dispersion slope at 1550 nm is greater than 0.1; effective area >65 µm² at 1550 nm; and cut off wavelength of fiber in cabled form in the range of about 1200 nm to 1500 nm.

The index profiles of the respective segments can be any of those defined above, including an α-profile, a step index profile, or a trapezoidal profile. Unless special steps are inserted in the process, the refractive index profiles will be rounded at points where the refractive index changes sharply. The rounding is due to diffusion of the dopant materials used to change the base glass refractive index. Thus any of these index profiles may be rounded at particular points. For example, a step index profile, having a positive Δ% will typically have rounded upper and lower corners.

In one embodiment of the invention, the core segments all have a positive Δ%. In another embodiment, the core comprises three segments, the first being an α-profile, the second a step profile and the third a rounded step profile. Examples of this embodiment are set forth in Table 1 below.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the description serve to explain the principles and operations of the invention.

DETAILED DESCRIPTION OF THE PREFERRED EMBODIMENTS

Definitions

Figure 1:
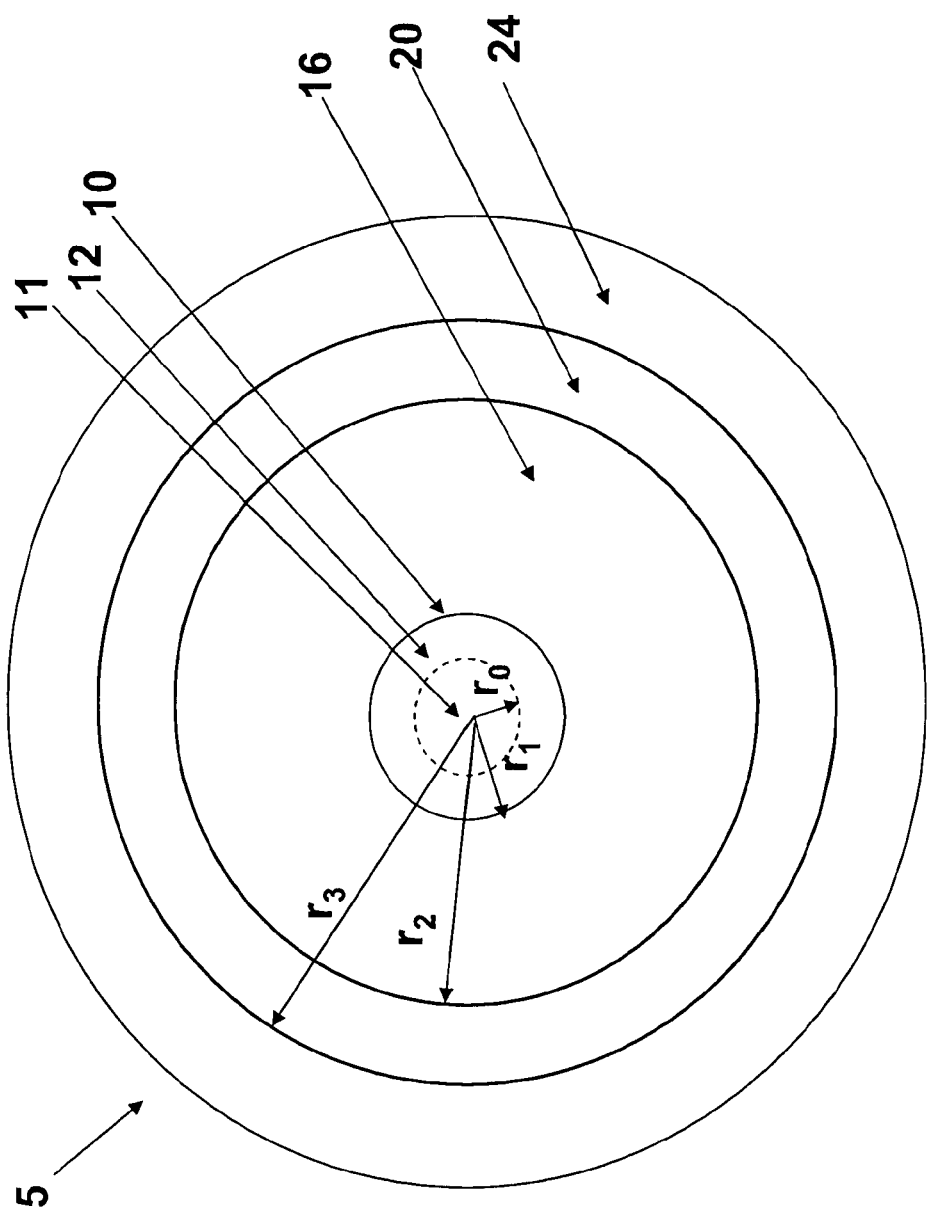
FIG. 1 illustrates schematically a cross-section of one exemplary fiber embodiment according to the present invention.
Figure 2:
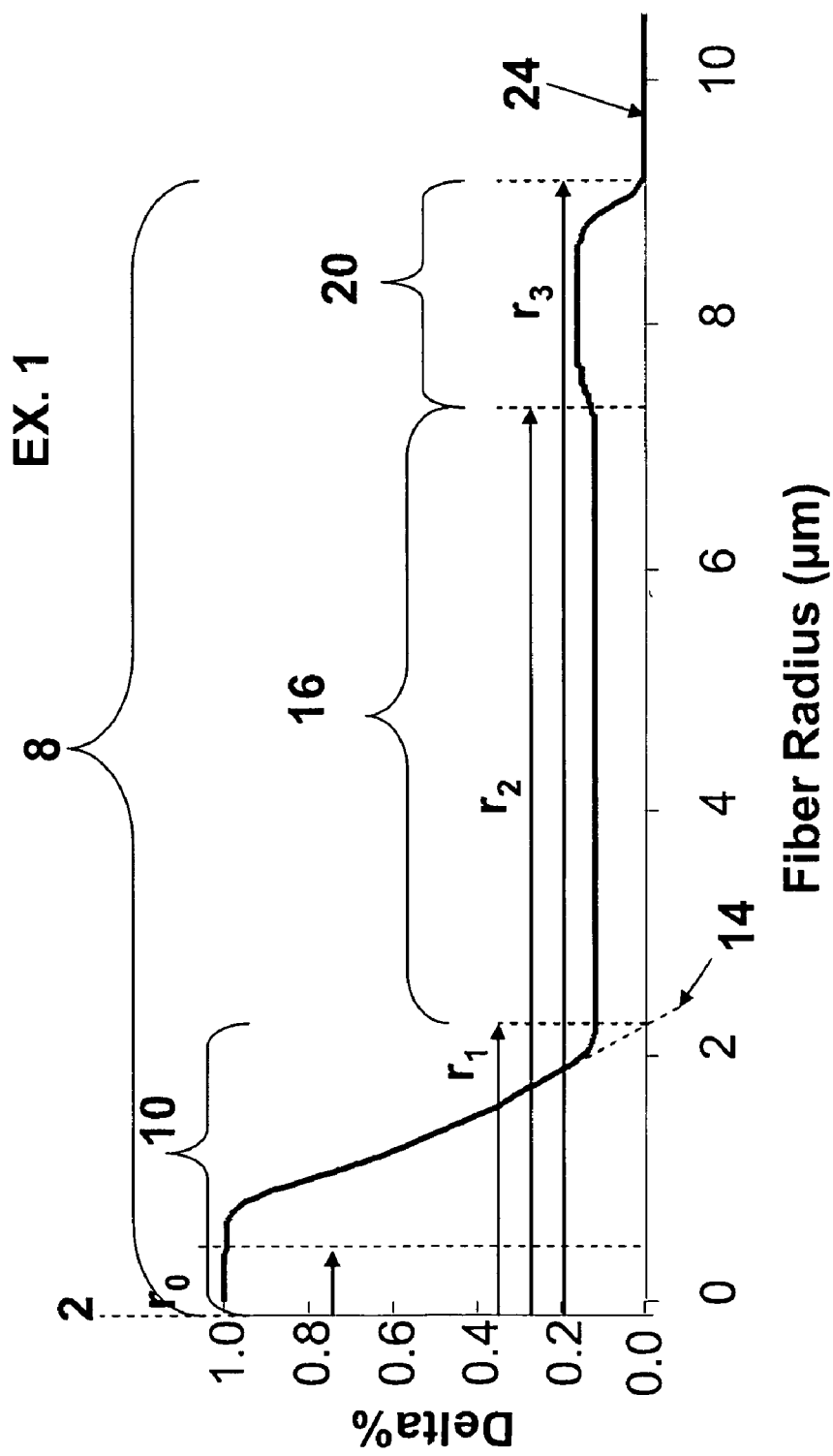
FIGS. 2-5 illustrate modeled refractive index profiles (Δ% vs. radius) of four exemplary fibers according to some embodiments of the present invention.
Figure 3:
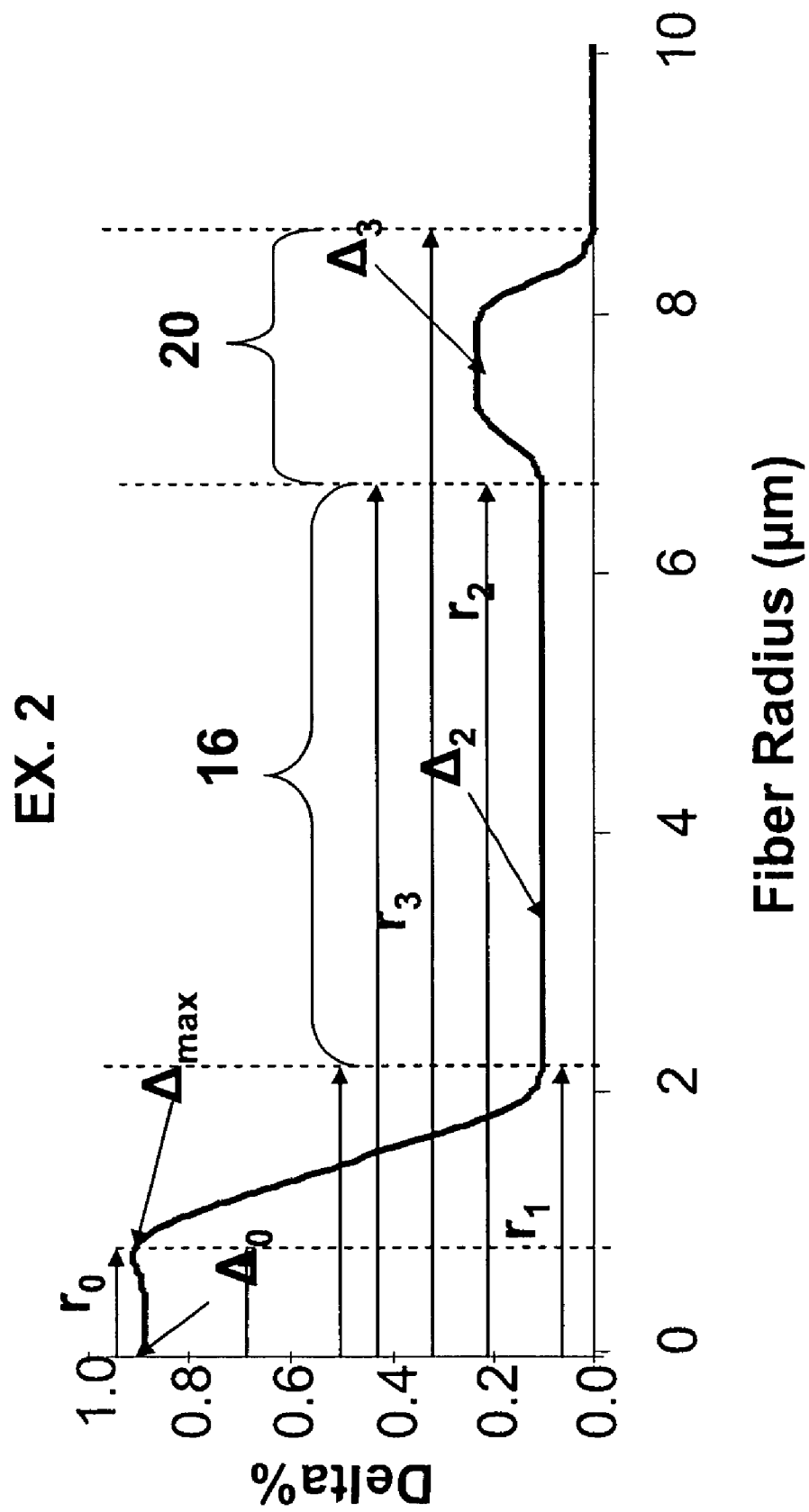
Figure 4:
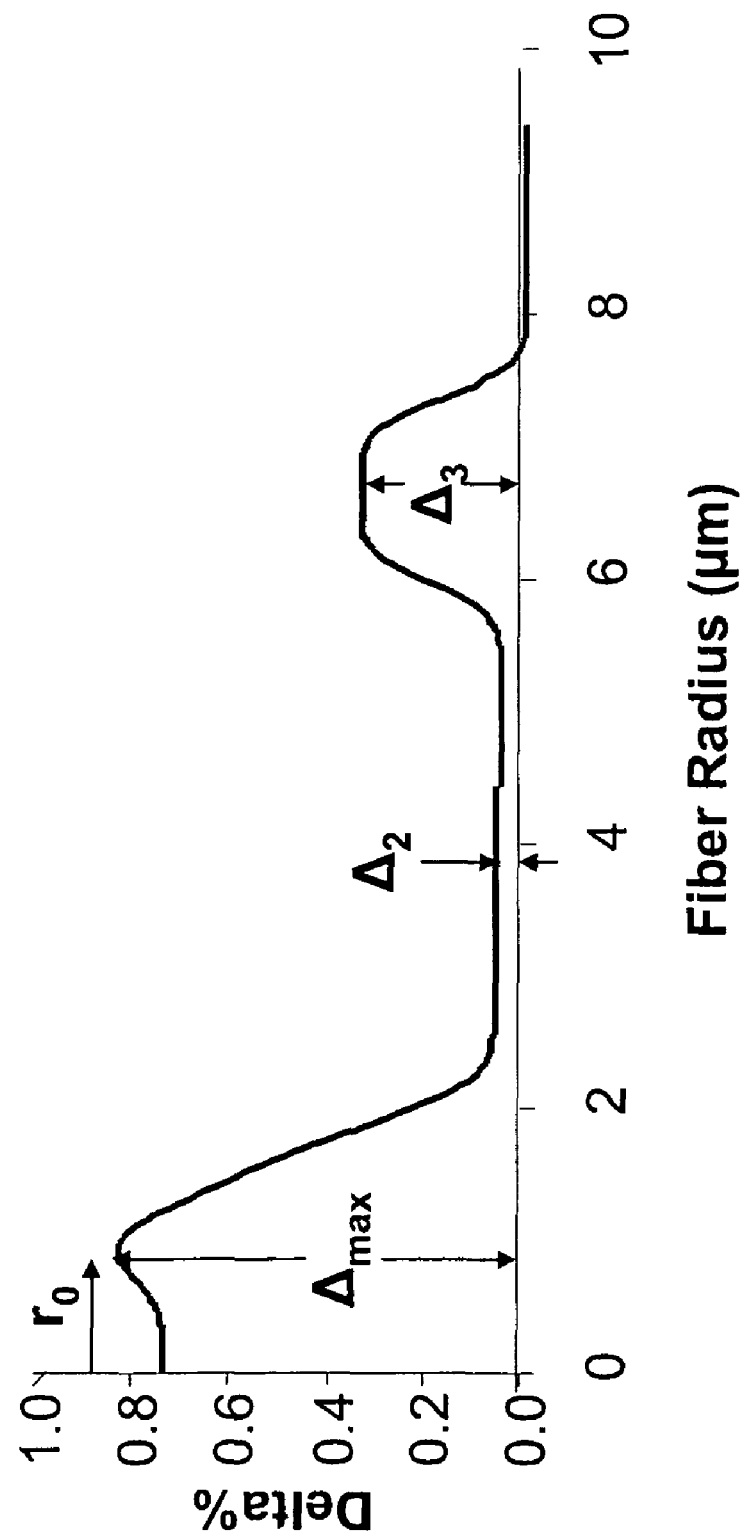
Figure 5:
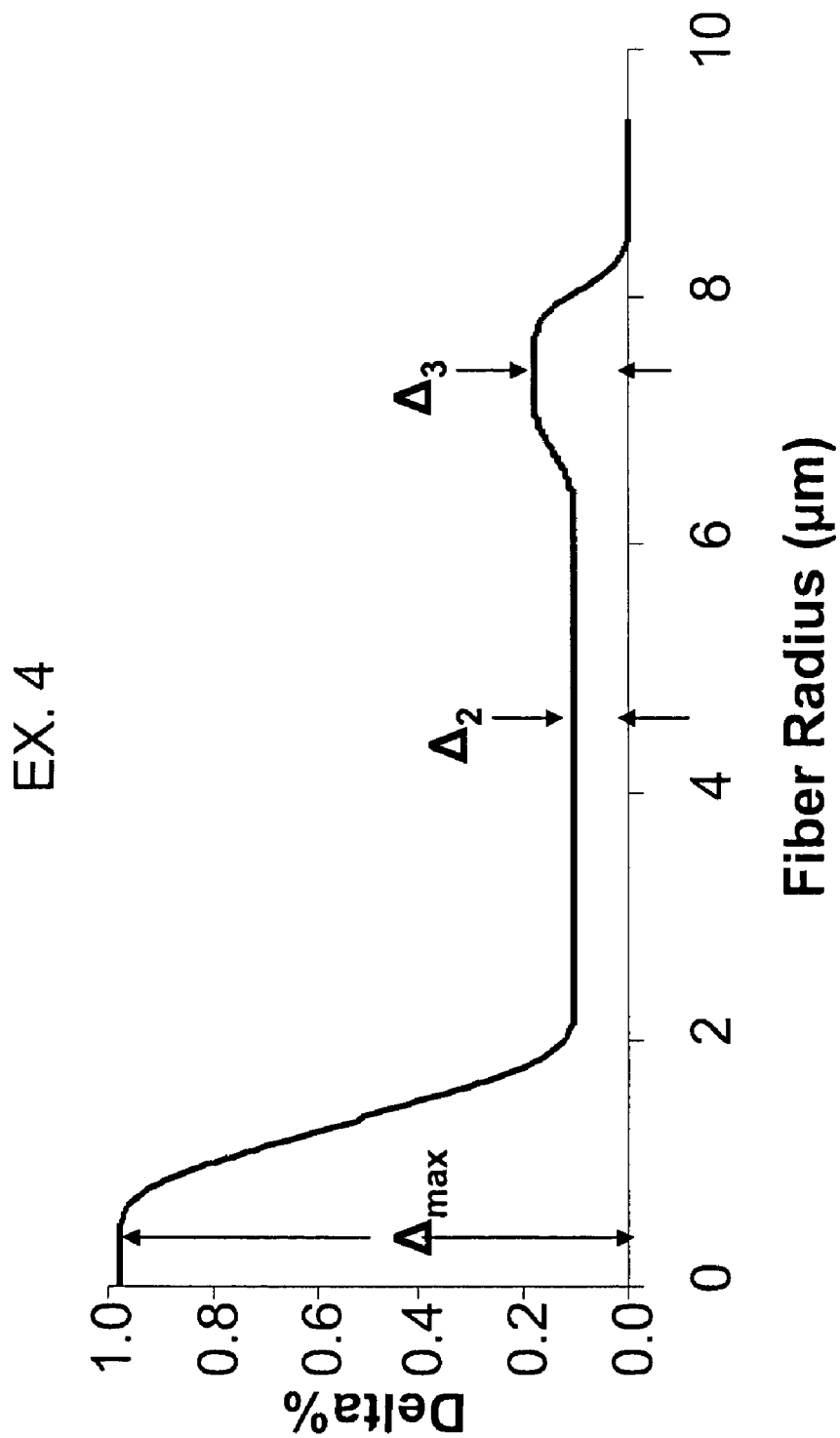

The radii of the index profile segments are defined as follows, (See FIG. 1-5 which illustrates a refractive index profile as a graph of Δ% vs. fiber radius).

a. The radius $r_0$ of the central section of the first core segment is measured from the axial centerline of the fiber to the intersection with a vertical line drawn through the Δmax% point of the first core segment. If the central section of the first core segment is substantially flat (i.e., Δmax% extends over a range of radii, or $\Delta_0\% \geq 0.6\Delta max\ \%$), the radius $r_0$ corresponds to the furthest distance from the centerline that has $\Delta max\ \%$ value.

b. The outer radius of the first core segment, $r_1$, is measured from the axial centerline of the fiber to the intersection of the extrapolated central index profile with the x axis, i.e., the $\Delta\%=0$ point;

c. The outer radius, $r_2$, of the second core segment corresponds to the radius at which second core segment's $\Delta\%$ is 0.02 higher than the minimum value of $\Delta\%$ for the second core segment;

d. The outer radius, $r_3$, of the third core segment is measured from the axial centerline of the fiber to the radius where the refractive index profile first reaches $\Delta=0.02\%$ (with respect to that of the cladding).

The width, $w_i$, of a core segment is taken to be the distance between the inner radius and the outer radius of the segment. It is understood that the outer radius of a segment corresponds to the inner radius of the next segment.

The volume $V_i$ of a core segment is defined as $2\int(\Delta\%\ r\ dr)$, where the integration limits are the inner and outer radii of this segment. For example, for the third core segment, the inner radius is $r_2$ and the outer radius is $r_3$. The units of the profile volume is $\%\ \mu m^2$ because relative index of refraction is dimensionless.

No particular significance is attached to a particular definition of index profile geometry. Of course, in carrying out a model calculation the definitions must be used consistently as is done herein.

The effective area is: $A_{eff}=2\pi(\int E^2 r\ dr)^2/(\int E^4 r\ dr)$, where the integration limits are 0 to $\infty$, and E is the electric field associated with the propagated light. The effective area is wavelength dependent. The wavelength at which the effective area is calculated is the wavelength at or near the center of the operating window for which the fiber is designed. More than one $A_{eff}$ may be assigned to a fiber which operates over a range of the order of hundreds of nanometers.

The term refractive index profile or simply index profile is the relation between $\Delta\%$ (where $\Delta\%=100\times(n(r)^2-n_c^2)/2n(r)^2$), and radius r over a selected portion of the fiber, where $\Delta\%$ is a relative refractive index, $n(r)$ is the refractive index of the fiber at a radius r, and $n_c$ is a reference refractive index which is taken to be, in this application, the refractive index of the clad layer.

The maximum relative refractive index of the first core segment is defined by the equation: $\Delta max\ \%=100\times(n_1^2-n_c^2)/2n_1^2$, where $n_1$ is the maximum refractive index of the index profile of the first core segment, and $n_c$ is a reference refractive index which is taken to be, in this application, the refractive index of the clad layer. $\Delta_0\%$ is the relative refractive index at the centerline of the first core segment.

The term α-profile refers to a core's refractive index profile expressed in terms of $\Delta(b)\%$, where b is radius, which follows the equation, $\Delta(b)\% = \Delta(b_0)(1-[|b-b_0|/(b_1-b_0)]^{\alpha})$, where $b_0$ is the radial point at which the index is a maximum and $b_1$ is the point at which $\Delta(b)\%$ is zero and b is in the range $b_i \leq b \leq b_f$, where delta is defined above, $b_i$ is the initial point of the α-profile, $b_f$ is the final point of the α-profile, and α is an exponent which is a real number.

Total dispersion is defined as the algebraic sum of fiber dispersion and material dispersion. Total dispersion is sometimes called chromatic dispersion in the art. The units of total dispersion are ps/nm-km.

The bend resistance of a fiber is related to induced attenuation due to fiber bending (bend loss) at a specified wavelength, under prescribed test conditions. Standard test conditions include 100 turns of fiber around a 75 mm diameter mandrel and 1 turn of fiber around a 32 mm diameter mandrel. In each test condition the bend induced attenuation is measured, usually in units of dB/(turn).

The cut off wavelength λc of fiber in cabled form (i.e., cable cutoff wavelength) measurement. Cabled cutoff measurement is described in IEC 60793-1-44 Cable Cutoff Wavelength of Single-mode Fiber by Transmitted Power, or "FOTP-80. (The IEC 60793 Fiber Optic Test Procedures are part of the IEC Fiber Optics Standards, that is, the International Electrotechnical Commission-Fiber Optics Test Procedures, more commonly known as FOTP's.).

Description of the Embodiments

Reference will now be made in detail to the present preferred embodiments of the invention, examples of which are illustrated in the accompanying drawings. Whenever possible, the same reference numerals will be used throughout the drawings to refer to the same or like parts. One embodiment of the optical fiber of the present invention is shown in FIG. 1, and is designated generally throughout by the reference numeral 5.

More specifically, FIG. 1 illustrates schematically a cross-sectional area of one exemplary fiber embodiment according to the present invention. The optical fiber 5 includes a core 8 that has at least at least three core segments 10, 16 and 20 surrounded by a cladding 24. The first core segment 10 is characterized by the maximum relative refractive index delta $\Delta max\ \%$ and includes: (i) a central section 11, and (ii) a surrounding annular section 12 with α of 0.7 to 1.2.

FIGS. 2-5 illustrate refractive index profiles ($\Delta\%$ vs. radius) of four exemplary fibers (Ex. 1-Ex. 4) corresponding to a fiber of FIG. 1. In FIGS. 1 and 2-5 the outer radius of the first core segment 10 is shown by line $r_1$ drawn from the core centerline 2 to the intersection of extrapolated line 14 with the horizontal axis. The first core segment 10 includes a central section 11 with a relatively flat delta profile and an outer radius $r_0$, such that the relative refractive index delta $\Delta_0\%$ at the center line is: $\Delta_0\% \geq 0.6\Delta max\ \%$, and in some embodiments $\Delta_0\% \geq 0.75\Delta max\ \%$. Preferably, $\Delta_0\% \geq 0.8\Delta max\ \%$, more preferably, $\Delta_0\% \geq 0.85\Delta max\ \%$ even more preferably $\Delta_0\% \geq 0.9\Delta max\ \%$, and most preferably $\Delta_0\% \geq 0.95\Delta max\ \%$. This relatively flat delta profile of the central section 11 of the first core segment 10 advantageously provides low fiber attenuation and also helps to make the fiber more manufacture-friendly. According to some embodiments, $r_0$ is not less than 0.5 μm, for example 0.5 μm<$r_0$<1.5 μm. Preferably, 1.1 μm $\geq r_0 \geq$ 0.6 μm. For example, $r_0$ may be 0.7 μm, 0.8 μm, 0.9 μm, 1 μm, or 1.05 μm. The second core segment 16 has a substantially uniform refractive index profile with a lower relative refractive index delta ($\Delta_2\%$) than that of the first segment (i.e, $\Delta_2\%<\Delta max\ \%$). In the following embodiments $\Delta_2\%>0.0$. The inner radius of the second core segment 16 is $r_1$ and the outer radius of the second core segment 16 is $r_2$. The third core segment 20 has a relative refractive index delta ($\Delta_3\%$) which is larger than $\Delta_2\%$, but smaller than $\Delta max\ \%$. The third core segment 20 is characterized by its outer radius, $r_3$. The mid point radius $r_{3mid}$ of the third core segment 20 is defined as: $r_{3mid}=(r_3+r_2)/2$. The third core segment 20 has a width $w_3$, defined as $r_3-r_2$.

The exemplary fiber profiles of FIGS. 2-5 illustrate that the relative refractive index profile of third segment 20 preferably does not have a Gaussian geometry. Preferably the third segment 20 has an approximately trapezoidal refractive index profile, with a relatively large width $w_3$ and relatively low relative refractive index compared to that of first core segment 10. According to some of the embodiments of the present invention, Δmax %≦1.25 (i.e., Δmax is not greater than 1.25) and the ratio of (Δmax %)/(Δ$_3$%) is greater than 2.3. More preferably, Δmax % is not greater than 1 and the ratio of (Δmax %)/(Δ$_3$%) is greater than 2.4, more preferably greater than 3, for example this ratio may be 3.5, 4, 3.5, 5, 5.5, 6, 6.5 or 7. According to the embodiments of the present invention the width w$_3$ of the third core segment 20 is greater than 2.0 μm, preferably greater than 2.15 μm, more preferably equal to or greater than 2.175 μm, for example 2.17 μm≦w$_3$≦2.7 μm. According to the embodiments of the present invention the volume V$_3$ of the third core segment 20 is preferably less than 7% μm$^2$, more preferably less than 6.9% μm$^2$, for example 3.5% μm$^2$≦V$_3$≦6.8% μm$^2$. These feature of the third core segment 20, either separately and/or in combination with one another were found to improve attenuation of the fiber. In these embodiments, the core 8 has three segments, so the core segment 20 is the final core segment. Other embodiments may include additional (optional) core segments.

Preferably, according to some embodiments, the optical fibers 5 have a zero dispersion wavelength (λ$_0$) of greater than 1500 nm, more preferably greater than 1550 nm, and even more preferably 1565 nm≦λ$_0$≦1600 nm. For example, the zero dispersion wavelength λ$_0$ may be in the 1575 nm to 1590 nm range, or more preferably, in the 1580 nm to 1585 nm range. Preferably, according to some embodiments, the dispersion slope (D-slope) at 1550 nm is greater than 0.1 ps/nm$^2$-km, more preferably between 0.11 ps/nm$^2$-km and 0.125 ps/nm$^2$-km. Preferably, in some embodiments total dispersion D at the wavelength of 1560 nm (D$_{1560}$) is more negative than about −0.5 ps/nm-km.

Preferably, the optical fibers 5 have attenuation at 1550 nm (Attn 1550) of less than 0.25 dB/km, equal to or less than 0.22 dB/km, even more preferably equal to less than 0.21 dB/km. Preferably, the optical fibers 5 have total dispersion at 1550 nm (D$_{1550}$) of equal to or less than −1 ps/nm/km (e.g., −2 ps/nm/km to −6 ps/nm/km), and more preferably less than −3 ps/nm/km (e.g., −3.5 ps/nm/km to −4.5 or −5.0 ps/nm/km). Preferably, the effective area Aeff at 1550 nm is greater than 65 nm$^2$, more preferably at least 70 nm$^2$, for example 70 nm$^2$, 71 nm$^2$, or 72 nm$^2$. Preferably, the cut off wavelength λc of fiber in cabled form (i.e., cable cut off wavelength) is in the range of about 1200 nm to 1500 nm, for example 1200 nm, 1250 nm, 1300 nm, 1350 nm, 1400 nm, 1440 nm, 1450 nm, or 1460 nm.

Thus, it is preferable, that in a three segment embodiment, the segmented core 8 is described by the parameters:
Δ$_{max}$ % in the range of about 0.75 to 1.25;
r$_1$ in the range of about 1.5 to 4.0 μm;
Δ$_2$% in the range of about 0.00 to 0.2%;
Δ$_3$% in the range of about 0.1 to 0.4;
outer radius r$_3$ in the range of about 7 to 11 μm; and, width w$_3$ of the third segment in the range of about 1.5 to 3 μm.
A preferred range is:
Δ$_{max}$% in the range of about 0.8 to 1.20;
r$_1$ in the range of about 2.0 to 3.0 μm;
Δ$_2$% in the range of about 0.05 to 0.18%;
Δ$_3$% in the range of about 0.15 to 0.38;
outer radius r$_3$ in the range of about 8 to 10 μm; and, width w$_3$ of the third segment in the range of about 2.0 to 2.8 μm.
A more preferred range is:
Δ$_{max}$% in the range of about 0.85 to 1.00;
r$_1$ in the range of about 2.2 to 2.6 μm;
Δ$_2$% in the range of about 0.05 to 0.15%;
Δ$_3$% in the range of about 0.15 to 0.35;
outer radius r$_3$ in the range of about 8.2 to 9.5 μm; and, width w$_3$ of the third core segment in the range of about 2.1 to 2.7 μm.

The following optical fiber embodiments (fiber Examples 1-4) corresponding to FIGS. 2-5 have core parameters tabulated in Tables 1 and optical parameters tabulated in Table 2.

TABLE 1

| Fiber | Ro | Δ$_0$% | Δmax % | r$_1$ | α | Δ$_2$% | r$_2$ | Δ$_3$% | (Δmax %)/(Δ$_3$%) |
|---|---|---|---|---|---|---|---|---|---|
| Ex 1 | 0.61 | 0.98 | 0.996 | 2.4 | 0.7 | 0.118 | 7.15 | 0.155 | 6.426 |
| Ex 2 | 0.75 | 0.88 | 0.910 | 2.2 | 1.2 | 0.103 | 6.75 | 0.233 | 3.906 |
| Ex 3 | 0.95 | 0.73 | 0.828 | 2.6 | 1.4 | 0.050 | 5.575 | 0.341 | 2.428 |
| Ex 4 | 0.58 | 0.97 | 0.979 | 2.2 | 1.1 | 0.103 | 6.5 | 0.182 | 5.379 |

| Fiber | r$_3$ | W$_3$ | V$_3$ | Δmax %−Δ$_0$% | Δmax %/(Δ$_0$%) | Attn 1550 nm |
|---|---|---|---|---|---|---|
| Ex 1 | 9.475 | 2.325 | 4.4 | 0.016 | 1.02 | 0.199 |
| Ex 2 | 8.925 | 2.175 | 4.78 | 0.03 | 1.03 | 0.201 |
| Ex 3 | 8.250 | 2.675 | 6.64 | 0.15 | 1.14 | 0.208 |
| Ex 4 | 8.900 | 2.400 | 3.87 | 0.009 | 1.01 | 0.200 |

The Δ% on centerline (i.e., Δ$_0$%), for the embodiments of the optical fiber 5 are typically between 0.62 and 0.99, more preferably between 0.75 and 0.98 (for example 0.91, 0.76, 0.63, or 0.93). The difference between Δmax % and Δ$_0$% (i.e., Δmax %−Δ$_0$%), may be between 0.01 and 0.22 (e.g., 0.09, 0.16, 0.21, and 0.05)

The difference between Δmax % and Δ$_0$% (i.e., Δmax %−Δ$_0$%), is 0.016, 0.103, 0.15, and 0.009, for examples 1-4, respectively. It is preferable that the difference be less than 0.22, more preferably less than 0.2, even more preferably less than 0.15 and, even more preferably less than 0.15, because the smaller the difference between Δmax % and Δ$_0$% the lower the attenuation. It is preferable that Δ$_0$% be greater than about 0.6 of Δmax %, more preferably greater than 0.75 of Δmax %, even more preferably greater than 0.85 of Δmax %, and most preferably greater about 0.9 of Δmax %. In some embodiments Δ$_0$%≧0.95Δmax %. It is noted that the alpha values of the first core segment for the four exemplary fiber embodiments of Table 1 are ≠1, i.e., α<1 or α>1. The optical fiber typically exhibits bend loss at 1550 nm of not more than 0.5 dB/turn when turned around a 32 mm diameter mandrel, preferably not more than 0.2 dB/turn, and more preferably not more than 0.1 dB/turn.

TABLE 2

| | EX#1 | EX#2 | EX#3 | EX#4 |
|---|---|---|---|---|
| D$_{1550}$ | −4.07 | −3.94 | −4.08 | −4.04 |
| D-slope@1550 | 0.1202 | 0.1207 | 0.1208 | 0.1208 |
| MFD$_{1550}$ | 9.250 | 9.333 | 9.309 | 9.253 |
| Aeff @1550 | 70.117 | 71.573 | 71.140 | 70.171 |
| λc (nm)-cable | 1396 | 1343 | 1339 | 1202 |
| Attn 1550 | 0.199 | 0.201 | 0.203 | 0.200 |
| Kappa 1550 | −33.893 | −32.616 | −33.765 | −33.406 |
| LP11 | 1730 | 1683 | 1680 | 1558 |
| LP02 | 1547 | 1515 | 1500 | 1447 |
| λ$_0$ | 1584 | 1583 | 1584 | 1583 |
| D$_{1625}$ | 4.586 | 4.765 | 4.672 | 4.628 |

In the above Table-2 the LP11 is the theoretical cutoff for the 11 mode and LP02 is the theoretical cutoff for the 02 mode, D$_{1625}$ is the total dispersion at 1625 nm, MFD$_{1550}$ is the mode field diameter of the fiber a 1550 nm, and Kappa is the ratio of dispersion to dispersion slope at 1550 nm.

Thus the manufacturing results provide a fiber suitable in every respect for use in severe environments such as undersea telecommunications cables.

The polarization mode dispersion of the above exemplary fibers is less than 0.08 ps/(km)$^{1/2}$ and typically less than about 0.04 ps/(km)$^{1/2}$.

Thus, according to some embodiments, a single mode optical fiber comprises: (i) a segmented core 8 having at least three segments 10, 16 and 20, wherein the first segment 10 has a $\Delta_{max}$% in the range of about 0.75 to 1.1, an outer radius $r_1$ in the range of about 1.5 to 3.0 μm; the second segment 16 has a $\Delta_2$% in the range of about 0.00 to 0.15%; and the third segment 20 has a $\Delta_3$% less than 0.35%, an outer radius $r_3$ in the range of about 7 μm to 11 μm, a width $w_3$ in the range of about 1.5 μm to 3 μm, and volume $V_3$<7% μm$^2$; and (ii) a silica clad layer 24 surrounding and in contact with the core 8, the clad layer 24 having a refractive index $n_c$; wherein the refractive index profiles of the core segments 10, 16 and 20 are selected to provide: attenuation (intrinsic attenuation) at 1550 nm no greater than 0.25 dB/km; zero dispersion wavelength in the range of about 1565 nm to 1600 nm; total dispersion at 1550 nm in the range of about −6 to −0.5 ps/nm-km; dispersion slope at 1550 nm in the greater than 0.1 and preferably in the range of 0.115 to 0.125; effective area>65 μm$^2$ at 1550 nm; and cut-off wavelength of fiber in cabled form (i.e., cable cut off wavelength) in the range of about 1200 nm to 1500 nm. Preferably clad layer 24 is made of pure (i.e., undoped) silica. Preferably the fiber Kappa values when measured at the wavelength of 1550 nm are between −32.5 and −34.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

I claim:

1. A single mode optical fiber comprising: (i) a segmented core having at least three segments, wherein the first segment has a $\Delta_{max}$% in the range of about 0.75 to 1.1, $\Delta_0$%≧0.6$\Delta$max %, and an outer radius $r_1$ in the range of about 1.5 to 3.0 μm; the second segment has a $\Delta_2$% in the range of 0.00 to 0.15%; and the third segment has a $\Delta_3$% less than 0.35% and volume $V_3$ of 3.8% μm$^2$<$V_3$<6.65% μm$^2$, an outer radius $r_3$ in the range of about 7 μm to 11 μm, a width $w_3$ in the range of about 1.5 to 3 μm, and volume $V_3$<7% μm$^2$; and (ii) a silica based clad layer surrounding and in contact with the core, the clad layer having a refractive index $n_c$; wherein the refractive index profiles of the core segments are selected to provide: zero dispersion wavelength in the range of about 1565 nm to 1600 nm; total dispersion at 1550 nm in the range of about −6 to −0.5 ps/nm-km; and dispersion slope at 1550 nm is greater than 0.1 ps/nm$^2$-km.

2. A single mode optical fiber comprising: (i) a segmented core having at least three segments, wherein the first segment has a $\Delta_{max}$% in the range of about 0.75 to 1.1, $\Delta_0$%≧0.6$\Delta$max %, and an outer radius $r_1$ in the range of about 1.5 to 3.0 μm; the second segment has a $\Delta_2$% in the range of about 0.00 to 0.15%; and the third segment has a $\Delta_3$% in the range of less than 0.35%, an outer radius $r_3$ in the range of about 7 μm to 11 μm, a width $w_3$ in the range of about 1.5 to 3 μm, and volume $V_3$<7% μm$^2$; and (ii) a silica based clad layer surrounding and in contact with the core, the clad layer having a refractive index $n_c$; wherein the refractive index profiles of the core segments are selected to provide: attenuation at 1550 nm not greater than 0.25 dB/km; zero dispersion wavelength in the range of about 1565 inn to 1600 nm; total dispersion at 1550 nm in the range of about −6 to −0.5 ps/nm-km; dispersion slope at 1550 nm is in the range of 0.115 to 0.125 ps/nm$^2$-km, effective area>65 μm$^2$ at 1550 nm; and cable cut off wavelength is in the range of about 1200 nm to 1500 nm.

3. The single mode optical fiber of claim 2, wherein the cable cut off wavelength is in the range of about 1200 nm to 1400 nm, zero dispersion wavelength is between 1580 nm to 1585 nm, and attenuation at 1550 nm no greater than 0.22 dB/km.

4. The single mode optical fiber of claim 2, wherein the fiber core has a relative refractive index at the center line $\Delta_0$%≧0.8$\Delta$max %.

5. The single mode optical fiber of claim 2, wherein the fiber core has a center line relative refractive index or $\Delta_0$%≧0.9$\Delta$max %.

6. The single mode optical fiber of claim 5, wherein the cut off wavelength of fiber in cabled form in the range of about 1200 nm to 1400 nm, zero dispersion wavelength is 1580-1585 nm and attenuation at 1550 nm no greater than 0.21 dB/km.

7. The single mode optical fiber of claim 1, wherein 2.3<($\Delta$max %)/($\Delta_3$%)<7.

8. The single mode optical fiber of claim 1, wherein 2.5<($\Delta$max %)/($\Delta_3$%)<6.5.

9. The single mode optical fiber of claim 1, wherein the radius $r_0$ of a centeral section of the first core segment is $r_0$≧0.5 μm.

10. The single mode optical fiber of claim 9, wherein the radius $r_0$ of a centeral section of the first core segment is 0.5 μm<$r_0$<1.5 μm.

11. The single mode optical fiber of claim 9, wherein the fiber core has a center line relative refractive index of $\Delta_0$%≧0.75$\Delta$max %.

12. The single mode optical fiber of claim 11 wherein the fiber core has a center line relative refractive index of $\Delta_0$%≧0.9$\Delta$max %.

13. The single mode optical fiber of claim 11 wherein ($\Delta$max %)/($\Delta_3$%)<6.5.

14. The single mode optical fiber of claim 11 wherein 2.5<($\Delta$max %)/($\Delta_3$%)<6.5.

15. The single mode optical fiber of claim 11, wherein $\Delta_3$% is 0.15% to 0.35%, the outer radius $r_3$ is in the range of about 8.2 μm to 9.5 μm and $w_3$ is 2.1 μm to 2.7 μm.

16. The single mode optical fiber of claim 15, wherein $\Delta_3$% is 0.15% to 0.25%.

17. The single mode optical fiber of claim 1, wherein the outer radius $r_3$ is in the range of about 8.2 μm to 9.5 μm, and $w_3$ is 2.1 μm to 2.7 μm.

18. The single mode fiber of claim 1, said fiber having bend loss at 1550 nm not more than 0.5 dB/turn when turned around a 32 mm diameter mandrel.

* * * * *